United States Patent Office 3,485,880
Patented Dec. 23, 1969

3,485,880
POLYHALOGENATION OF ADAMANTANE HYDROCARBONS
Abraham Schneider, Overbrook Hills, Pa., assignor to Sun Oil Company, Philadelphia, Pa., a corporation of New Jersey
No Drawing. Filed Feb. 5, 1968, Ser. No. 702,789
Int. Cl. C07c 17/00
U.S. Cl. 260—648                          20 Claims

ABSTRACT OF THE DISCLOSURE $C_{10}$–$C_{20}$ adamantane hydrocarbons are polychlorinated or polybrominated at bridgehead positions by reacting the same under homogeneous conditions and at $-30°$ C. to $10°$ C. with a $C_4$–$C_5$ tertiary alkyl chloride or bromide, using as catalyst dissolved $AlCl_3$ or $AlBr_3$ in amount sufficient to promote polyhalogenation of the adamantane nucleus.

CROSS REFERENCE TO RELATED APPLICATION

My application Ser. No. 649,810, filed June 29, 1967, and now abandoned, describes reactions of adamantane hydrocarbons wherein, in certain embodiments, the reactant materials and the catalyst can be the same as are used in the present invention. However, in the process of said application the reaction is carried out under conditions such that bis-type or polymer products are formed wherein adamantane nuclei are linked to each other between bridgehead positions through tetramethylene linkages. Reactions according to the present invention are effected under different conditions that result, instead, in the formation of polyhalogenated adamantane derivatives.

BACKGROUND OF THE INVENTION

This invention relates to a method of converting $C_{10}$–$C_{20}$ adamantane hydrocarbons into bridgehead polyhalogenated derivatives. More particularly the invention is concerned with polychlorination or polybromination of adamantane or alkyladamantanes having two or more unsubstituted bridgehead carbon atoms.

The adamantane nucleus has ten carbon atoms, four of which are bridgehead carbons that are equivalent to each other, as can be seen from the following typographical representation:

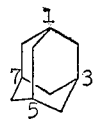

As shown, the bridgehead carbon atoms customarily are designated by the numerals 1, 3, 5 and 7 respectively.

In the prior art adamantane itself has been polyhalogenated by reaction with free chlorine or bromine in the presence of $AlCl_3$ or $AlBr_3$ as catalysts, as disclosed in the following references: Stetter and Wulff, Chem. Ber., 93, 1366 (1960); Stetter, Angew. Chem. Internat. Edit., vol. 1 (1962), No. 6, 287–288; and German Patent No. 1,101,410. In the presence of the catalyst substitution of the halogen only at bridgehead positions occurred.

The foregoing procedures also can be used to polyhalogenate alkyl-substituted adamantanes and yield bridgehead halogenated derivatives. However, with alkyl substituents in the starting adamantane hydrocarbon, there is a tendency for halogenation to occur in the alkyl groups as well as on the nucleus. Thus mixtures of halogenated products in which the halogen appears both in the substituent groups and on the nucleus are obtained. Halogenation by means of free chlorine or bromine consequently is not particularly satisfactory when the starting material is an alkyladamantane and only bridgehead halogenated products are desired.

Also in the prior art, Gerzon et al., J. Med. Chem., 6, 760–763 (1963), and Gerzon U.S. Patent No. 3,096,372 disclose the reaction of adamantane in a non-homogeneous system with t-butyl chloride promoted by means of $AlCl_3$. Conditions were such that a separate catalyst complex phase formed. The main reaction was a hydrogen-chlorine interchange between the two reactants yielding 1-chloroadamantane. These references give no indication that dichloro or higher polychlorinated derivatives of adamantane could be obtained in this type of reaction.

SUMMARY OF THE INVENTION

The present invention provides a facile means of converting adamantane and alkyladamantanes having two or more unsubstituted bridgehead positions into bridgehead polychloro or polybromo derivatives. The procedure involves a hydrogen-halogen interchange reaction between two or more unsubstituted bridgehead positions on the adamantane nucleus and a $C_4$–$C_5$ tertiary alkyl chloride or bromide, promoted by means of $AlCl_3$ or $AlBr_3$ in solution. Only bridgehead positions on the nucleus are involved in the reaction, and consequently halogen atoms are not transferred either to nonbridgehead positions on the nucleus or into alkyl substituents of the alkyladamantane feed.

The process of the invention comprises the following steps:

(a) Forming a solution of (1) a $C_{10}$–$C_{20}$ adamantane hydrocarbon which is adamatane or an alkyladamantane having at least two unsubstituted bridgehead carbon atoms and no alkyl tertiary carbon atom, and (2) a $C_4$–$C_5$ tertiary alkyl halide in which the halogen is chlorine or bromine in molar ratio to said hydrocarbon in excess of 2:1, said solution being capable of dissolving and maintaining therein the aluminum trihalide hereinafter specified;

(b) Maintaining said solution at a temperature in the range of $-30°$ C. to $10°$ C. while admixing therewith and dissolving therein an aluminum trihalide in which the halogen is the same as that in the tertiary halide, the weight ratio of aluminum trihalide to the tertiary halide being in excess of 1.2:100 and sufficient to promote polyhalogenation of said hydrocarbon at bridgehead positions; and (c) Maintaining the resulting solution within said temperature range and in homogeneous phase until at least a major portion of said hydrocarbon has become polyhalogenated.

DESCRIPTION OF THE INVENTION

As a specific illustration of the process, 10 parts (by weight) of 1,3-dimethyladamantane are dissolved in 100 parts of tertiary butyl bromide, the solution is cooled to $-5°$ C. and 3 parts of $AlBr_3$ are mixed into and dissolved in the solution. The mixture is stirred at $-5°$ C. for 30 minutes, during which time isobutane is formed and partly evolves. The mixture remains essentially homogeneous, no separate catalyst complex phase being formed. The reaction which mainly takes place is as follows (hydrogen atoms being omitted):

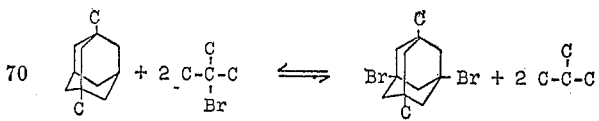

As indicated by the equation, an equilibrium reaction is involved and hence evolution of isobutane from the mixture helps increase the yield of the polybrominated product, which in this case is 1,3-dibromo-5,7-dimethyladamantane. The product can be recovered by washing the reaction mixture with water to deactivate the catalyst and evaporating the excess tertiary butyl bromide.

A further illustrative reaction involving a higher degree of polyhalogenation of the adamantane nucleus is the following, wherein 1-ethyladamantane is converted into the bridgehead trichloro derivative:

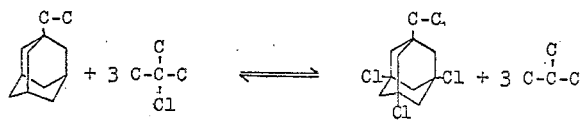

This reaction is carried out in generally the same way as indicated in the preceding example except that a higher proportion of aluminum trihalide is used, the $AlCl_3$ preferably being added incrementally over a period of time.

The halogenating agent for practicing the invention must be a $C_4$ or $C_5$ tertiary alkyl chloride or bromide or, in other words, t-butyl or t-amyl chloride or bromide. Primary or secondary halides are not suitable, for these will not react in the manner desired. For instance, primary or secondary butyl halides will react in the manner described in my aforesaid application Ser. No. 649,810 to give bis-type or polymer products containing two or more adamantane nuclei joined by tetramethylene linkages. Also it is essential for purposes of the present invention that a low reaction temperature, i.e., in the range of $-30°$ C. to $10°$ C., be used, as bridgehead polyhalogenation of the adamantane nucleus is not selectively achieved at higher temperature levels. Preferably a reaction temperature in the range of $-10°$ C. to $5°$ C. is employed.

It is also important in the present process that the reaction mixture comprising the $C_{10}$–$C_{20}$ adamantane hydrocarbon and the $C_4$–$C_5$ tertiary alkyl halide be capable of dissolving and maintaining in solution therein all of the $AlCl_3$ or $AlBr_3$ added. In other words, conditions must be such as to maintain substantially the entire reaction mixture as a single phase and avoid the formation of a separate catalyst complex phase. The preferred way of establishing and maintaining a homogeneous system is to utilize a considerable excess of the tertiary alkyl halide over the stoichiometric amount required for the desired degree of polyhalogenation. When the $AlCl_3$ or $AlBr_3$ is added to the mixture, it reacts with the tertiary alkyl halide to form a complex and this complex must remain at least mainly in solution. The precise function of the complex is not known with certainty and it may be that at least part of it acts as the catalytic species. However, it is considered more probable that dissolved $AlCl_3$ or $AlBr_3$ is the catalytic agent and that, at least in the case of $AlCl_3$, the complex formed is necessary for bringing the $AlCl_3$ into solution. In any event, sufficient excess tertiary alkyl halide should be present to act as solvent for this catalyst complex and keep it in solution. Otherwise, if a homogeneous reaction mixture is not maintained and the catalyst complex forms a separate phase, the desired polyhalogenation will not be achieved and the main product will be the monohalogenated derivative.

For example, when dimethyladamantane is to be reacted with t-butyl chloride to give the 1,3-dichloro product a substantial excess of t-butyl chloride over the stoichiometric 2:1 molar ratio should be used so that the aluminum chloride complex will remain in solution. Typically a molar ratio of t-butyl chloride to dimethyladamantane above 3:1, e.g., in the range of 4:1 to 20:1, can be employed to maintain a homogeneous solution. For dichlorination or dibromination of other starting adamantane hydrocarbons, analogous ratios of reactants are employed.

On the other hand, if bridgehead trihalo or tetrahalo adamantanes are desired, then stoichiometric ratios of the tertiary alkyl halide to adamantane hydrocarbon needed for reaction are 3:1 or 4:1. Hence correspondingly larger amounts of the tertiary alkyl halide should be used to provide an adequate excess of solvent.

Another manner of practicing the invention to maintain homogeneity of the reaction mixture is to employ the $C_4$–$C_5$ tertiary alkyl halide in approximately the stoichiometric amount needed for the hydrogen-halogen interchange reaction, and additionally to use an inert halogenated solvent to keep in solution the complex formed between the tertiary alkyl halide and the $AlCl_3$ or $AlBr_3$. Certain halogenated hydrocarbons are inert under conditions used in the process and will not themselves react with the aluminum trihalide to form a complex. These can be used as solvents to maintain the reaction mixture in homogeneous phase. Halogenated hydrocarbons which are suitable for this purpose include the following: methylene chloride; 1,1,2,2-tetrachloroethane; pentachloroethane; and the bromine homologues of each of the foregoing solvents. This manner of practicing the invention is not, however, generally preferred since it requires an additional component in the reaction system, and it is usually preferably merely to use an excess of the $C_4$–$C_5$ tertiary alkyl halide as solvent and thus dispense with the need for an inert halogenated solvent.

The starting hydrocarbon can be adamantane or any $C_{11}$–$C_{20}$ alkyladamantane that has at least two unsubstituted bridgehead positions in the nucleus. The alkyladamantane can include one, two or more alkyl substituents which can be located at bridgehead and/or non-bridgehead positions provided that at least two bridgehead carbon atoms are unsubstituted. Alkyladamantanes as here specified are known and methods of preparing them have been described, for example in the following: U.S. Patent No. 3,128,316; U.S. Patent No. 3,275,700; U.S. Patent No. 3,336,405; U.S. Patent No. 3,336,406; U.S. Patent No. 3,356,751; Schneider U.S. application Ser. No. 613,443, filed Feb. 2, 1967, now U.S. Patent No. 3,382,288; Spengler et al., Erdöl und Kohle-Erdgas-Petrochemie, 15, 702–707 (1962); and Hoek et al., 85, (1966) Recueil 1045–1053.

The preferred starting hydrocarbons for the present process are adamantane and the lower alkyladamantanes in which the alkyl groups are methyl and/or ethyl and the total alkyl carbon atoms are from one to four. These lower alkyladamantanes comprise methyladamantanes; dimethyladamantanes; trimethyladamantanes; ethyladamantanes; methylethyladamantanes and dimethylethyladamantanes. Some specific examples of these are as follows: 1-methyladamantane; 2-methyladamantane; 1,2-, 1,3- and 1,4-dimethyladamantanes; 1- and 2-ethyladamantanes; 1-ethyl-3-methyladamantane; 1-ethyl - 4 - methyladamantane; 1,2,4-, 1,2,5-, 1,3,4- and 1,3,6-trimethyladamantanes; 1-ethyl-2,4-dimethyladamantane; and 1-ethyl-3,6-dimethyladamantane. Illustrative examples of other starting hydrocarbons containing higher alkyl groups are: 1- and 2-butyladamantanes; 1-methyl-3-propyladamantane; 1-ethyl-2-methyl-5-amyladamantane; n-hexyladamantanes; n-decyladamantanes; and the like.

A preferred way of carrying out the invention utilizing an excess of tertiary alkyl halide as solvent is given in the following description using 1,3-dimethyladamantane (herein "DMA") as the hydrocarbon, t-butyl chloride as the tertiary halide and $AlCl_3$ as catalyst. The DMA is dissolved in the t-butyl chloride, using, for example, between 5 and 15 moles of t-butyl chloride per mole of DMA, and the mixture is cooled to $0°$ C. While the mixture is being well agitated, $AlCl_3$ is added thereto in amount of at least 1.2 and usually between 1.5 and 5 parts by weight per hundred parts of t-butyl chloride. In some cases it may be advantageous to add the $AlCl_3$ in incremental amounts throughout a time of 10–60 minutes in order to more easily control reaction conditions such as temperature and rate of gas evolution. However, if control of the reaction presents no problem, substantially the same results can be obtained by adding all of the required amount of $AlCl_3$ at once.

When an amount of $AlCl_3$ is added, it goes into solution and forms with the t-butyl chloride a complex which remains in solution. As previously mentioned, the complex formed may act as solvent for uncomplexed $AlCl_3$ which, when brought into solution, functions as the catalytic agent. This promotes the hydrogen chlorine exchange reaction. Also a slow evolution of HCl generally occurs indicating some side reaction, and the catalyst activity concurrently declines until the reaction ceases. Addition of a further amount of $AlCl_3$ will then result in more solubilized catalyst and further promote the hydrogen-chlorine exchange reaction until the catalyst activity again diminishes. The procedure of adding incremental amounts of $AlCl_3$ can be continued to promote the exchange reaction, if desired, until all bridgehead carbon atoms have been substituted with chlorine. Alternatively, all of the $AlCl_3$ needed can be added at the beginning provided that the reaction does not proceed so fast as to get out of control. As previously mentioned, removal of isobutane from the system as it is formed will aid in carrying the polychlorination reaction to completion.

The amount of $AlCl_3$ or $AlBr_3$ that should be used depends mainly upon the amount of tertiary alkyl halide in the mixture, the degree of polyhalogenation desired and the reaction temperature selected within the specified range of −30° C. to 10° C. The higher the reaction temperature the greater is the tendency of the $AlCl_3$ or $AlBr_3$ to be consumed in side reactions and the more that will be required. As a general rule, the weight proportion of aluminum trihalide to tertiary alkyl halide should be in excess of 1.2:100 and sufficiently in excess of this ratio to effect the desired degree of polyhalogenation. Example I, described hereinafter, illustrates the importance of using an adequate amount of the aluminum trihalide.

When the reaction has been completed, the mixture can be washed with water to remove the catalyst residues and then worked up in any suitable manner to separate the polyhalogenated adamantane products. Usually it will be desirable to recover the excess tertiary alkyl halide by distillation and recycle the same for further use. The dihalo, trihalo and tetrahalo products are generally solids that melt considerably above room temperature. They can be recovered from any unreacted adamantane hydrocarbons or can be separated from each other by fractional crystallization from suitable solvents, e.g., ketones, alcohols or aromatic hydrocarbons such as toluene and xylenes.

The following examples are specific illustrations of the invention:

Example I

This example illustrates the reaction of 1-ethyladamantane (herein "EA") with t-butyl chloride with the objective of producing 1,3-dichloro-EA in high yield. A solution of 1.00 g. (0.0061 mole) of EA and 4.74 g. (0.0512 mole) of t-butyl chloride was stirred at 0° C. and 0.05 g. of $AlCl_3$ was added. The molar ratio of t-butyl chloride to EA was 8.4. The $AlCl_3$ dissolved and a very slow evolution of HCl occurred. The mixture was stirred at 0° C. for 15 minutes, and a small sample (Cut No. 1) was taken for analysis. The reaction at 0° C. was then continued by the addition of 0.05 g. of $AlCl_3$ and stirring for 10 minutes more, at which time a second sample was taken (Cut No. 2). A third 0.05 g. increment of $AlCl_3$ was then added and stirring was continued at 0° C. for an additional 34 minutes, following which a final sample (Cut No. 3) was taken. The reaction mixture was homogeneous during the entire reaction period. Each of the samples was washed with water, dried and then analyzed by VPC. Results are shown in Table I and are given in weight percent on a t-butyl chloride-free basis.

TABLE I

|  | Cut 1 | Cut 2 | Cut 3 |
|---|---|---|---|
| Total reaction time, min. | 15 | 25 | 59 |
| G. $AlCl_3$/100 g. t-butyl chloride | 1.1 | 2.1 | 3.2 |
| Product composition, wt. percent: |  |  |  |
| EA | 3.8 |  |  |
| 1-chloro-EA | 87.9 | 15.0 | 13.3 |
| 1,3-dichloro-EA | 8.4 | 78.8 | 79.7 |
| 1,3,5-trichloro-EA |  | 2.4 | 2.3 |
| Unknown chloro product |  | 3.9 | 4.7 |

A sample of the effluent 1,3-dichloro-EA was trapped from the VPC and was found to have a melting point of 34–36° C.

The results in Table I show the importance of using an adequate proportion of $AlCl_3$ in order to polychlorinate the adamantane nucleus. As shown, at a ratio of 1.1 g. of $AlCl_3$/100 g. of t-butyl chloride, the main product was 1-chloro-EA and only about 8% of the dichloro product had been produced. However, when the ratio was increased to 2.1:100, the yield of 1,3-dichloro-EA increased to almost 79%. Interpolation between these results indicates that under the conditions of this run a ratio of $AlCl_3$ to the tertiary chloride of the order of 1.5:100 is required before the dichloro derivative becomes the main reaction product.

Example II

This example illustrates the dichlorination of DMA using t-butyl chloride in about the same proportion as in the preceding example. Specifically a solution of 1.00 g. of DMA and 4.92 g. of t-butyl chloride (molar ratio of t-butyl chloride:DMA=8.7) was stirred at 0° C. and 0.1 g. $AlCl_3$ was added. The weight ratio of $AlCl_3$ to the t-butyl chloride was about 2.0:100. The $AlCl_3$ immediately dissolved, a very slow evolution of HCl occurred and the reaction mixture was homogeneous. The mixture was stirred for a total of 15 minutes and was then washed with water and with a 5% $NaHCO$, solution, dried over anhydrous $K_2CO_2$ and analyzed by VPC. Results are given in Table II on a solvent-free basis.

TABLE II

Total reaction time, min. _____ 15
$AlCl_3$/100 g. t-butyl chloride, g. _____ 2.0
Product composition, wt. percent:
    DMA _____ ___
    1-chloro-DMA _____ 27.5
    1,3-dichloro-DMA _____ 59.4
    Chlorobutyl DMA's _____ 13.1

The effluent 1,3-dichloro-DMA was trapped from the VPC and was found to have a melting point above 90° C.

The data in Table II show that under the conditions of this run the main reaction product was the bridgehead dichloro derivative of the starting hydrocarbon. However, a substantial amount of chlorobutyl DMA's was also obtained, indicating a significant amount of undesired side reactions.

Example III

This example was run in substantially the same way as Example II using DMA and t-butyl chloride, except that the molar ratio of the latter to DMA was increased to 17.9. Also the $AlCl_3$ was added in two equal increments, respectively, at the start and at 32 minutes, the total proportion of $AlCl_3$ to t-butyl chloride being about 2.0:100. Results are shown in Table III.

TABLE III

Total reaction time, min. _____ 60
$AlCl_3$/100 g. t-butyl chloride, g. _____ 2.0
Product composition, wt. percent:
    DMA _____ ___
    1-chloro-DMA _____ 21.3
    1,3-dichloro-DMA _____ 78.7

The results in Table III show that use of the higher proportion of solvent gave a cleaner reaction and resulted in a good yield (about 79%) of the desired dichloro derivative.

Example IV

This example shows the polychlorination of adamantane (herein "A"). Again t-butyl chloride was used and the temperature was maintained at 0° C. Specifically, to a solution of 1.00 g. of A and 6.00 g. of t-butyl chloride (molar ratio 8.8) cooled to 0° C., 0.1 g. of $AlCl_3$ was added and the mixture was stirred for 12 minutes; then 0.15 g. more of $AlCl_3$ was added and the mixture was stirred until a total reaction time of one hour was reached. The product was washed and analyzed as before, giving results as shown in Table IV.

TABLE IV

| | |
|---|---|
| Total reaction time, min. | 60 |
| $AlCl_3$/100 g. t-butyl chloride, g. | 8.8 |
| Product composition, wt. percent: | |
| A | --- |
| 1-chloro-A | 6.7 |
| 1,3-dichloro-A | 86.5 |
| 1,3,5-trichloro-A | 1.1 |
| 1,3,5,7-tetrachloro-A | 4.0 |

The results in Table IV show that a good yield of the bridgehead dichloroadamantane was obtained. Also higher chlorination products, specifically the bridgehead trichloro and bridgehead tetrachloro adamantane derivatives were produced. The yield of these products could have been increased by adding further amounts of $AlCl_3$ and continuing the reaction.

Analogous results are obtained when other adamantane hydrocarbons as herein specified are substituted for the starting adamantane compounds used in the foregoing examples. Likewise essentially equivalent results are obtained when tertiary butyl bromide is used in place of the tertiary chloride. The polyhalogenation reaction also proceeds in substantially the same manner when tertiary amyl chlorides or bromides are used, but in such cases more side reactions tend to occur.

The polyhalogenation products prepared in accordance with the present invention are useful as intermediates for producing adamantane derivatives having two or more functional groups other than halogen attached to the bridgehead positions. For example, the dichloro or dibromo adamantanes prepared in the present process can be used as described in U.S. Patent No. 3,356,718 to make dicarboxyadamantanes which are useful for polymerization with such difunctional compounds as diamines or dialcohols. The dihalo products also can be hydrolyzed to produce the corresponding bridgehead dihydroxyadamantanes which are useful for preparing special ester-type lubricants as described in Duling and Schneider U.S. Ser. No. 531,059, filed Mar. 2, 1966, now U.S. Patent No. 3,398,165.

What is claimed is:

1. Process of preparing bridgehead polyhalogenated adamantane hydrocarbons which comprises:
   (a) forming a solution of (1) a $C_{10}$–$C_{20}$ adamantane hydrocarbon which is adamantane or an alkyl adamantane having at least two unsubstituted bridgehead carbon atoms and no alkyl tertiary carbon atom, and (2) a $C_4$–$C_5$ tertiary alkyl halide in which the halogen is chlorine or bromine in molar ratio to said hydrocarbon in excess of 2:1, said solution being capable of dissolving and maintaining therein the aluminum trihalide hereinafter specified;
   (b) maintaining said solution at a temperature in the range of −30° C. to 10° C. while admixing therewith and dissolving therein an aluminum trihalide in which the halogen is the same as that in said teritary halide, the weight ratio of aluminum trihalide to the teritary halide being in excess of 1.2:100 and sufficient to promote polyhalogenation of said hydrocarbon at bridgehead positions;
   (c) and maintaining the resulting solution within said temperature range and in homogeneous phase until at least a major portion of said hydrocarbon has become polyhalogenated.

2. Process according to claim 1 wherein said $C_4$–$C_5$ tertiary alkyl halide is teritary butyl chloride or bromide.

3. Process according to claim 2 wherein said temperature is in the range of −10° C. to 5° C.

4. Process according to claim 3 wherein said weight ratio of aluminum trihalide to the tertiary butyl halide is above 1.5:100.

5. Process according to claim 1 wherein the starting adamantane hydrocarbon is selected from the group consisting of adamantane, methyladamantanes, dimethyladamantanes, trimethyladamantanes, ethyladamantanes, methylethyladamantanes and dimethylethyladamantanes.

6. Process according to claim 5 wherein said $C_4$–$C_5$ tertiary alkyl halide is teritary butyl chloride or bromide.

7. Process according to claim 6 wherein said weight ratio of aluminum trihalide to the tertiary butyl halide is above 1.5:100.

8. Process according to claim 7 wherein said temperature is in the range of −10° C. to 5° C.

9. Process according to claim 1 wherein the halogen in said tertiary halide and the aluminum trihalide is chlorine and said $C_{10}$–$C_{20}$ adamantane hydrocarbon is converted mainly to the corresponding 1,3-dichloroadamantane derivative.

10. Process according to claim 9 wherein the starting hydrocarbon is adamantane and the main product is 1,3-dichloroadamantane.

11. Process according to claim 9 wherein the starting hydrocarbon is a dimethyladamantane and the main product is 1,3-dichloro-dimethyladamantane.

12. Process according to claim 9 wherein the starting hydrocarbon is an ethyladamantane and the main product is 1,3-dichloro-ethyladamantane.

13. Process according to claim 9 wherein the tertiary halide is tertiary butyl chloride, the aluminum trihalide is $AlCl_3$, the weight ratio of $AlCl_3$ to tertiary butyl chloride is above 1.5:100 and the temperature is in the range of −10° C. to 5° C.

14. Process according to claim 1 wherein the halogen in said tertiary halide and the aluminum trihalide is bromine and said $C_{10}$–$C_{20}$ adamantane hydrocarbon is converted mainly to the corresponding 1,3-dibromoadamantane derivative.

15. Process according to claim 9 wherein the starting hydrocarbon is adamantane and the main product is 1,3-dibromoadamantane.

16. Process according to claim 9 wherein the starting hydrocarbon is a dimethyladamantane and the main product is 1,3-dibromo-dimethyladamantane.

17. Process according to claim 9 wherein the starting hydrocarbon is an ethyladamantane and the main product is 1,3-dibromo-ethyladamantane.

18. Process according to claim 9 wherein the tertiary halide is tertiary butyl bromide, the aluminum trihalide is $AlBr_3$, the weight ratio of $AlBr_3$ to tertiary butyl bromide is above 1.5:100 and the temperature is in the range of −10 °C. to 5° C.

19. Process according to claim 1 wherein said temperature is in the range of −10° C. to 5° C. and said weight ratio of aluminum trihalide to the tertiary alkyl halide is above 1.5:100.

20. Process according to claim 19 wherein the starting adamantane hydrocarbon is selected from the group consisting of adamantane, methyladamantanes, dimethyladamantanes, trimethyladamantanes, ethyladamantanes, methylethyladamantanes and dimethylethyladamantanes.

References Cited

UNITED STATES PATENTS

| | | | |
|---|---|---|---|
| 3,096,372 | 7/1963 | Gerzon | 260—648 |
| 2,742,507 | 4/1956 | Schneider | 260—648 |
| 2,447,139 | 8/1948 | Schmerling | 260—648 |

FOREIGN PATENTS 1,101,410  3/1961  Germany.

LEON ZITVER, Primary Examiner

H. T. MARS, Assistant Examiner

U.S. Cl. X.R.

260—410, 514, 617